(12) United States Patent  
Mahmoud et al.

(10) Patent No.: US 11,795,372 B2
(45) Date of Patent: Oct. 24, 2023

(54) METHOD OF REMOVING SULFATE SCALE

(71) Applicant: King Fahd University of Petroleum and Minerals, Dhahran (SA)

(72) Inventors: Mohamed Mahmoud, Dhahran (SA); Muhammad Shahzad Kamal, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 17/671,103

(22) Filed: Feb. 14, 2022

(65) Prior Publication Data
US 2023/0076912 A1 Mar. 9, 2023

Related U.S. Application Data

(60) Provisional application No. 63/241,733, filed on Sep. 8, 2021.

(51) Int. Cl.
*C09K 8/528* (2006.01)

(52) U.S. Cl.
CPC .................. *C09K 8/528* (2013.01)

(58) Field of Classification Search
None
See application file for complete search history.

(56) References Cited

U.S. PATENT DOCUMENTS

| 2,606,157 A | * | 8/1952 | Cardwell | ................ | C02F 5/083 |
| | | | | | 252/175 |
| 2,787,326 A | * | 4/1957 | Hughes | ................ | C09K 8/528 |
| | | | | | 507/927 |
| 2,884,349 A | * | 4/1959 | Axelrad | ................ | C23G 1/02 |
| | | | | | 159/DIG. 13 |
| 2,947,690 A | * | 8/1960 | Axelrad | ................ | E21B 36/00 |
| | | | | | 299/6 |
| 3,639,279 A | * | 2/1972 | Gardner | ................ | B01J 37/26 |
| | | | | | 507/260 |
| 3,684,720 A | * | 8/1972 | Richardson | ............... | C02F 5/12 |
| | | | | | 510/366 |
| 3,951,827 A | | 4/1976 | Burroughs et al. | | |

(Continued)

FOREIGN PATENT DOCUMENTS

| CA | 1074091 | 3/1980 |
| CN | 110898675 A | 3/2020 |
| WO | 93/08131 | 4/1993 |

OTHER PUBLICATIONS

Shakkthivel, et al. ; Newly developed itaconic acid copolymers for gypsum and calcium carbonate scale control ; Journal of Applied Polymer Science ; Dec. 19, 2006 ; Abstract Only ; 3 Pages.

(Continued)

*Primary Examiner* — John J Figueroa
(74) *Attorney, Agent, or Firm* — Oblon, McClelland, Maier & Neustadt, L.L.P.

(57) ABSTRACT

A method of removing a sulfate scale from a surface is provided. The method includes contacting the sulfate-comprising scale with a conversion solution including 1 to 10 wt. % of an alkali metal carbonate, 0.5 to 10 wt. % of a borate salt or hydrate thereof, and 0.5 to 2.5 wt. % of a base to produce a carbonate-comprising scale. The method further includes exposing the carbonate-comprising scale with an acid solution including 2.5 to 25 wt. % of an acid.

16 Claims, 5 Drawing Sheets

(56) References Cited

U.S. PATENT DOCUMENTS

| | | | | |
|---|---|---|---|---|
| 4,108,246 | A * | 8/1978 | Jones | C09K 8/528 507/927 |
| 4,144,185 | A * | 3/1979 | Block | B01D 65/02 210/698 |
| 4,980,077 | A * | 12/1990 | Morris | C02F 5/08 510/480 |
| 5,093,020 | A * | 3/1992 | Paul | G21F 9/002 510/480 |
| 6,494,218 | B1 | 12/2002 | Zaid et al. | |
| 7,078,370 | B2 * | 7/2006 | Crews | C09K 8/685 507/903 |
| 9,145,508 | B2 * | 9/2015 | Smith | C09K 8/74 |
| 10,336,934 | B2 * | 7/2019 | Talley | C09K 8/528 |
| 2007/0221246 | A1 * | 9/2007 | Keatch | C09K 8/528 134/41 |
| 2016/0068741 | A1 * | 3/2016 | Talley | C11D 3/08 510/188 |

OTHER PUBLICATIONS

Al-Khaldi, et al. ; New Insights into the Removal of Calcium Sulfate Scale ; SPE European Formation Damage Conference, Jun. 2011 ; Abstract Only ; 6 Pages.

Khormali, et al. ; Increasing efficiency of calcium sulfate scale prevention using a new mixture of phosphate scale inhib during waterflooding ; Journal of Petroleum and Science Engineering ; Feb. 2, 2018 ; Abstract Only ; 3 Pages.

Mahmoud, et al. ; Single-Stage Stimulation of Anhydrite-Rich carbonate Rocks Using Chelating Agent: An Experiment and Modeling Investigation ; SPE J. 26 (03) ; Jun. 16, 2021 ; 7 Pages.

Examination Report dated Aug. 7, 2023, in Saudi Patent Application No. 122440103, 9 pages.

Zhibao Li, et al., "Solubility of $CaSO_4$ Phases in Aqueous HCl + $CaCl_2$ Solutions from 283 K to 353 K", Journal of Chemical & Engineering Data, vol. 50, No. 6, Oct. 19, 2005, pp. 1971-1982.

* cited by examiner

METHOD OF REMOVING SULFATE SCALE

CROSS-REFERENCE TO RELATED APPLICATION

The present application claims priority to U.S. Provisional Application No. 63/241,733, filed Sep. 8, 2021, the teaching of which is hereby incorporated by reference in its entirety for all purposes

BACKGROUND

Technical Field

The present disclosure is directed to de-scaling, and particularly, to a method of removing sulfate scale.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Scale is a mineral deposit which may occur in tubing, gravel packs, perforations, piping, storage reservoirs, surface or sub-surface oil and gas production equipment and household plumbing. Such scale may prevent effective heat transfer, interfere with fluid flow, facilitate corrosive processes, or harbor bacteria, resulting in inefficiency and production equipment failures. Further, the scale may cause systemic and operational problems such as flooding or blockages in industrial water systems, production systems for oil and gas, and pulp and paper mill systems, causing delays and shutdowns for cleaning and removal. Therefore, mitigation of scale is essential for proper functioning of these systems.

One method of mitigating scale is to prevent its formation or deposition. Scale inhibition is desirable because common inorganic scales, such as sulfates, carbonates, or hydroxides containing calcium, barium, or strontium, once formed are difficult to remove by conventional treatments. Scale inhibitors are chemicals which delay, reduce or prevent scale formation when added in small amounts to normally scaling fluids, particularly water. Most of the modern scale inhibitors used in the oilfield function by one or both of nucleation inhibition or crystal growth inhibition. Nucleation inhibition occurs when the formed scale crystals are deranged or redissolved by inhibitor molecules. For homogenous crystallization, this derangement affects the thermodynamic stability of the growing nucleons. With crystal growth inhibition or retardation, the objective is to hinder the scale crystal growth.

Scale inhibition, however, is not always possible. The composition of material being used or the process parameters may be incompatible with treatments for scale inhibition. For example, in a process that uses seawater, it may not be feasable to remove scale-forming components such as calcium, phosphate, and carbonate to inhibit the deposition of scales comprising these components. In another example, the addition of a scale inhibitor to an oil deposit may be impossible or impractical for inhibiting scale formation in tubing bringing the oil to the surface, or may be effective for only a short time. Further, the scale inhibitor also may need to be removed from the oil at a later stage. Scale inhibitors may be effective at temporarily preventing or slowing the rate of deposition of scale, but are rarely able to completely prevent the formation and deposition of scale long term.

The other method by which scale is mitigated is removing scale after it has formed by physical or chemical means. Scale removal, however, is not without problems. Scale removal can involve harsh components and conditions which may damage the equipment the scale is deposited on. Also, chemical treatments such as a scale squeeze treatment or a continual chemical injection involve high operational costs and involve multiple stages of treatment. Moreover, most of the conventionally used chemical scale treatments can either remove or control scale precipitation, but are not effective in performing dual functions, i.e., scale inhibition and scale removal simultaneously. Further, for chemical scale removal, it is often necessary to tailor the scale remover composition and conditions to the specific composition of the scale. This necessity is further complicated by the fact that compositions may frequently change during a production history of an oil or gas well, which leads to complexity in the composition of the scale and difficulty in its removal processes. Sulfate-containing scales in particular are difficult to remove due to slow or ineffective removal by common acids used for scale removal such as acetic acid or HCl. Hence, there is a need of efficient methods which may substantially reduce or eliminate the above limitations.

SUMMARY

The present disclosure relates to a method of removing a sulfate-comprising scale from a surface. The method includes contacting the sulfate-comprising scale with a conversion solution including 1 to 10 weight percent (wt. %) of an alkali metal carbonate, 0.5 to 10 wt. % of a borate salt or hydrate thereof, and 0.5 to 2.5 wt. % of a base, to produce a carbonate-comprising scale. The method further includes exposing the carbonate-comprising scale with an acid solution including 2.5 to 25 wt. % of an acid.

In some embodiments, the alkali metal carbonate is potassium carbonate.

In some embodiments, the borate salt is sodium tetraborate.

In some embodiments, the base is a hydroxide base.

In some embodiments, the conversion solution has a pH in a range of 10 to 14, at initiation of the contact between the conversion solution and the sulfate-comprising scale.

In some embodiments, the conversion solution has a pH in the range of 10-15, throughout the duration of the contact between the conversion solution and the sulfate-comprising scale.

In some embodiments, the sulfate-comprising scale includes at least one selected from the group including barium sulfate, calcium sulfate, and strontium sulfate.

In some embodiments, the carbonate-comprising scale includes at least one selected from the group including barium carbonate, calcium carbonate, and strontium carbonate.

In some embodiments, the acid is at least one selected from the group including hydrochloric acid, formic acid, acetic acid, citric acid, N,N-dicarboxymethyl glutamic acid tetrasodium salt (GLDA), ethylenediamine tetra acetic acid (EDTA), hydroxyethyl ethylenediamine triacetic acid (HEDTA), trisodium dicarboxymethyl alaninate (MGDA), nitrilotriacetic acid (NTA), diethylenetriamine penta-acetic acid (DTPA), penta(methylene phosphonic acid) (DTPMP), hydroxy ethylidene diphosphonic acid (HEDP), and an 18-membered heterocycle (MACROPA).

In some embodiments, the sulfate-comprising scale is removed from one or more of a surface facility, a surface pipeline, a tubular well, a downhole pump, a downhole tool, and a geological formation, of an oil or gas well.

In some embodiments, the oil or gas well is a sour gas well including a sour natural gas including 4 to 4000 parts per million (ppm) hydrogen sulfide.

In some embodiments, the sulfate-comprising scale is removed from at least one or more of a surface facility, a surface pipeline, a well tubular, a downhole pump, a downhole tool, and a geological formation, of a carbon dioxide sequestration well.

In some embodiments, the method further includes contacting the sulfate-comprising scale with the conversion solution for a period of 1 to 12 hours.

In some embodiments, the method removes at least 80% of an initial amount of the sulfate-comprising scale.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
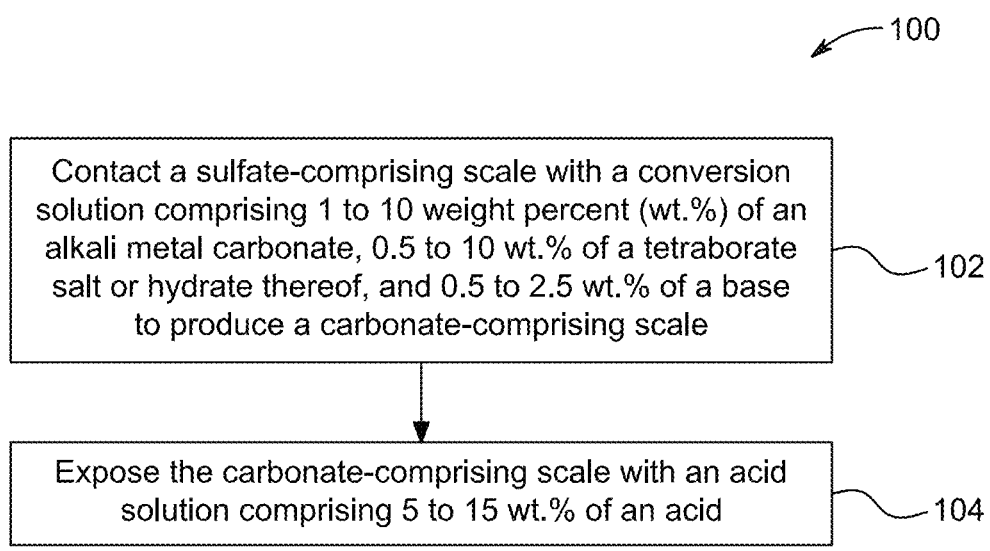
FIG. 1 is a schematic flow diagram of a method of removing a sulfate-comprising scale from a surface, according to certain embodiments.

In the drawings, like reference numerals designate identical or corresponding parts throughout the several views. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

Embodiments of the present disclosure are directed to a method for de-scaling or removing a sulfate-comprising scale from a surface. Example of sulfate materials which may be present in a sulfate-comprising scale include, but are not limited to barium sulfate, calcium sulfate, and strontium sulfate. Although the description herein provided is with reference to calcium sulfate scale, it may be understood by a person skilled in the art, that aspects of the present disclosure may also be applicable to remove scales including other sulfates such as, barium sulfate, strotium sulfate, and the like.

The sulfate-comprising scale can be removed from any suitable surface known to one of ordinary skill in the art. In some embodiments, the scale is removed from one or more surfaces of a surface facility, a surface pipeline, a well tubular, a downhole pump, a downhole tool, and a geological formation, of an oil or gas well. In some embodiments, the oil or gas well is a sour gas well including a sour natural gas including 4 to 4000 ppm hydrogen sulfide. In some embodiments, the oil or gas well is a sour crude oil well including a sour crude oil including 0.5 to 10 wt. % sulfur. In an alternate embodiment, the sulfate-comprising scale is removed from a suitable surface associated with surface facility, a surface pipeline, a well tubular, a downhole pump, a downhole tool, and/or a geological formation, of a carbon dioxide sequestration well. In some embodiments, the sulfate-comprising scale is a water-formed scale. A water-formed scale refers to a scale which is formed in or deposited by water. Water-formed scale can be formed for a number of reasons, such as change in temperature, mixing of incompatible waters (e.g. a water having a high barium or calcium concentration with one having a high sulfate concentration), loss of carbon dioxide, increase or decrease in pH, or drop in pressure. Water-formed scales are particularly prevalent in methods and applications in the oil and gas industry which introduce a fluid into a geological formation, such as hydrofracturing, injection wells, and sequestration wells.

Referring to FIG. 1, a schematic flow diagram of a method 100 of removing the sulfate-comprising scale from a surface is illustrated. It should be understood that any number of the described method steps can be combined in any order to implement the method 100. Additionally, individual steps may be removed or skipped from the method 100 without departing from the spirit and scope of the present disclosure.

At step 102, method 100 includes contacting the sulfate-comprising scale with a conversion solution to produce a carbonate-comprising scale. In some embodiments, the sulfate-comprising scale comprises at least one selected from the group consisting of barium sulfate, calcium sulfate, and strontium sulfate.

The conversion solution comprises 1 to 10 wt. %, preferably 2.5 to 9.5 wt. %, preferably 5 to 9 wt. %, preferably 7.5 to 8.5 wt. %, preferably 7.75 to 8.25 wt. %, preferably 7.9 to 8.1 wt. %, preferably 8.0 wt. % of an alkali metal carbonate, 0.5 to 10 wt. %, preferably 1 to 9.5 wt. %, preferably 1.5 to 9.0 wt. %, preferably 2.0 to 8.5 wt %, preferably 2.5 to 8.0 wt. % of a borate salt or a hydrate thereof, and 0.5 to 2.5 wt. %, preferably 0.6 to 2.25 wt. %, preferably 0.7 to 2.0 wt. %, preferably 0.8 to 1.75 wt. %, preferably 0.9 to 1.50 wt. %, preferably 0.95 to 1.25 wt. %, preferably 1.0 wt. % of a base. In general, the alkali metal carbonate may be a carbonate of any suitable alkali metal known to one of ordinary skill in the art. Examples of suitable alkali metals include lithium, sodium, potassium, rubidium, and cesium. In some embodiments, the alkali metal carbonate may be one or both of potassium carbonate ($K_2CO_3$) or cesium carbonate ($Cs_2CO_3$). In general, the borate salt may be any suitable borate salt known to one of ordinary skill in the art. The borate salt may comprise any suitable boron-comprising anion or oxyanion known to one of ordinary skill in the art. Examples of such boron-comprising anions or oxyanions include but are not limited to orthoborate, diborate, triborate, tetraborate, metaborate, and pentaborate. In some embodiments, the borate salt is sodium tetraborate (borax). In general, the base may be any suitable aqueous base known to one of ordinary skill in the art. In some embodiments, the base is at least one selected from the group consisting of an amine base, a carbonate base, a carboxylate base, and a hydroxide base. In some embodiments, the base is a hydroxide base. In preferred embodiments, the hydroxide base is at least one selected from the group consisting of ammonium hydroxide, sodium hydroxide, and potassium hydroxide. The purpose of the base to ensure a desired pH is maintained throughout the duration of reaction between the sulfate-comprising scale and the conversion solution. In some embodiments, the pH of the conversion solution at initial contact with the sulfate-comprising scale is in a range of 10 to 14, preferably 10.5 to 13.5, preferably 10.75 to 13.25, preferably 11 to 13. In some embodiments, the conversion solution has a pH throughout a duration of the contact of the conversion solution with the sulfate-comprising scale in a range of 10 to 14 preferably 10.5 to 13.5, preferably 10.75 to 13.25, preferably 11 to 13.

When the sulfate-comprising scale is in contact with the conversion solution including an alkali metal carbonate, a borate salt or a hydrate thereof, and a base, the sulfates in the sulfate-comprising scale are converted to corresponding acid soluble forms (also referred to as a converted product). For example, the calcium sulfate-comprising scale on contact with the conversion solution may be converted to calcium carbonate-comprising scale, the barium sulfate-comprising scale may be converted to barium carbonate-comprising scale, and the strontium sulfate-comprising scale may be converted to strontium carbonate-comprising scale. In some embodiments, the carbonate-comprising scale comprises at least one selected from the group consisting of barium carbonate, calcium carbonate, and strontium carbonate. In an embodiment, the contact between the sulfate-comprising scale and the conversion solution is for a period of 1 to 12 hours, preferably 2 to 10 hours, preferably 4 to 8 hours.

At step 104, the method 100 includes exposing the carbonate-comprising scale to an acid solution including 2.5 to 25 wt. %, preferably 3 to 22 wt. %, preferably 4 to 20 wt. %, preferably 5 to 18 wt. %, preferably 6 to 16 wt. %, preferably 7 to 15 wt. % of an acid. In some embodiments, the acid is at least one selected from the group including hydrochloric acid, formic acid, acetic acid, citric acid, N,N-dicarboxymethyl glutamic acid tetrasodium salt (GLDA), ethylenediamine tetra acetic acid (EDTA), hydroxy ethyl ethylenediamine triacetic acid (HEDTA), trisodium dicarboxymethyl alaninate (MGDA), nitrilotriacetic acid (NTA), diethylenetriamine penta-acetic acid (DTPA), diethylenetriamine penta(methylene phosphonic acid) (DTPMP), hydroxy ethylidene diphosphonic Acid (HEDP), and MACROPA (an 18-membered chelating heterocycle acid, N,N'-bis[(6-carboxy-2-pyridil)methyl]-4,13-diaza-18-crown-6). The acid dissolves the carbonates in the carbonate-comprising scale causing scale removal.

In some embodiments, the method 100 removes at least 80%, preferably at least 82.5%, preferably at least 85%, preferably at least 87.5%, preferably at least 90%, preferably at least 91%, preferably at least 92%, preferably at least 93%, preferably at least 94%, preferably at least 95%, preferably at least 96%, preferably at least 97%, preferably at least 97.5%, preferably at least 98%, preferably at least 98.5%, preferably at least 99%, preferably at least 99.5%, preferably at least 99.9% of an initial amount of the sulfate-comprising scale.

In some embodiments, the method 100 removes calcium sulfate scale from a surface associated with surface facilities, surface pipelines, well tubulars, electrical submersible pumps (ESPs), downhole equipment, reservoirs, and geological formations associated with oil and gas wells. The method 100 may be particularly advantageous for removing calcium sulfate scale, which otherwise, cannot be removed using conventional scale removal acids such as acetic acid and HCl. The method 100 may be particularly advantageous for removing anhydrite formed during $CO_2$ sequestration or from sandstone formation after $CO_2$ sequestration and $CO_2$ enhanced gas recovery process. The method 100 may be particularly advantageous in sour gas wells to remove anhydrite formed due to reaction of $H_2S$ with carbonate-containing materials.

In some embodiments, the method further comprises a scale pre-treatment. The scale pre-treatment may be advantageous for ensuring that the method is effective at removing the sulfate-comprising scale. The pre-treatment may, for example, remove non-sulfate scale, organic material such as biofouling or biofilms, petroleum, hydrocarbons, solvents, lubricants, drilling mud, or other non-sulfate-comprising scale material from the sulfate-comprising scale. The presence of such material may decrease an effectiveness of the conversion solution and/or acid solution. Such a decrease may be due to a chemical reaction of the material with the conversion solution and/or acid solution, physical blocking of contact between the sulfate-comprising scale and the conversion solution and/or acid solution, or a combination of these. The removal of such material may prevent this decrease. In some embodiments, the pre-treatment involves exposing the sulfate-comprising scale to a pre-treatment fluid. In some embodiments, the pre-treatment fluid comprises an acid. The acid may be any suitable acid as described above. In some embodiments, the acid is present in the pre-treatment fluid in an amount substantially the same as the acid solution used in the method. In some embodiments, the pre-treatment fluid comprises sulfuric acid. In some embodiments, the pre-treatment fluid comprises a surfactant. The surfactant may be as described below.

In some embodiments, the pre-treatment fluid comprises a sulfatizing agent. The sulfatizing agent may be any suitable substance useful for introducing sulfate ions or sulfate groups to a material or converting a material into a sulfate material. Pre-treatment with a sulfatizing or sulfating agent is an especially preferred embodiment of the invention. Sulfate-containing scale often forms as a mixture of different materials such as in combination with carboxylate-containing scales. Subjecting the scale to a sulfating agent functions to force the formation of sulfate scale and/or convert other scales to sulfate scale and thereby advantageously prepares the scaled surface for more thorough removal of sulfate scale. For example, in an oil field operation in which a gas pipe line conveys a mixture of gases produced from a geological formation, a scale may form that is partially sulfate, partially carbonate, partially sulfur, partially sulfide and may further contain other sulfur-containing materials. Pre-treatment with a sulfating agent preferably converts at least 50% by weight, more preferably 70% or more than 80% by weight of the scale to a sulfate-based scale. Both organic and inorganic sulfating agents may be effective. Organic sulfating agents such as hydrogen sulfide, methanethiol, ethanethiol, sulfuric acid/dicyclohexylcarbodiimide (DCC), and sulfur trioxide/amine adducts are particularly preferred in an oilfield environment in which the water content of a produced hydrocarbon gas stream is low in comparison to the content of sour gas (hydrogen sulfide). Examples of sulfatizing agents include, but are not limited to hydrogen sulfide, sulfur dioxide, sulfur trioxide, methanethiol, ethanethiol, sulfuric acid, sulfuric acid/dicyclohexylcarbodiimide (DCC), sulfur trioxide/amine adducts, chlorosulfuric acid and salts thereof, alkali metal sulfate salts, ammonium sulfate, alkaline earth sulfate salts, and combinations thereof. In some embodiments, the pre-treatment fluid comprises a pre-treatment solvent. The pre-treatment solvent may be water, an organic solvent, petroleum, a petroleum distillate such as diesel fuel, or a mixture thereof. Examples of organic solvents include, but are not limited to alcohol solvents such as methanol, ethanol, propanol, isopropanol, n-butanol, isobutanol, n-pentanol, n-hexanol, terpineol, menthol, prenol, 3-methyl-3-buten-1-ol, 2-ethyl-1-hexanol, 2-ethyl-1-butanol, 2-propylheptan-1-ol, 2-butyl-1-octanol, ethylene glycol, diethylene glycol, triethylene glycol, tetraethylene glycol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol, dipropylene glycol, propylene glycol monomethyl ether, pyrocatechol (1,2-benzenediol), resorcinol (1,3-benzenediol), phenol, cresol, benzyl alcohol, 1,3-propanediol, 1,3-butanediol, 2-butoxyethanol, 1,4-butanediol, 1,6-hexanediol, glycerol, pentaerythritol, manitol, sorbitol; ketone solvents such as acetone, methyl ethyl ketone (MEK); amide solvents such as formamide, dimethyl formamide, and dimethyl acetamide; halogenated solvents such as carbon tetrachloride, chloroform, bromoform, iodoform, and methylene chloride (also known as dichloromethane); organic acid solvents such as acetic acid, formic acid, and trifluoroacetic acid; aromatic solvents such as benzene, xylenes, toluene, and naptha; ether solvents such as tetrahydrofuran, diethyl ether, and 1,4-dioxane; nitrated solvents such as nitromethane and nitroethane; ester-containing solvents such as ethyl acetate; glycerins; glycols (e.g., polyglycols, propylene glycol, and ethylene glycol); polyglycol amines and polyols. In some embodiments, the pre-treatment fluid is a gas and comprises hydrogen sulfide. In some embodiments, the pre-treatment fluid is a gas and comprises sulfur dioxide. In some embodiments, the pre-treatment fluid is a gas and comprises sulfur trioxide. In some embodiments, the pre-treatment fluid comprises an inert gas. Examples of inert gases include, but are not limited to nitrogen, helium, argon, neon, carbon dioxide, and sulfur hexafluoride. Such embodiments may be particularly useful where the sulfate-comprising scale is disposed on a surface associated with a gas well.

In some embodiments, the pre-treatment converts non-sulfate scale into sulfate scale, which can then be removed by the method.

In some embodiments, the conversion solution and/or the acid solution further comprises a corrosion inhibitor. A corrosion inhibitor is a substance added to or used in combination with a substance which contacts metal surfaces such as a scale removal solution for the purpose of preventing or lessening the rate of corrosion of the metal surface exposed to the substance. The use of corrosion inhibitors is necessary to protect wellbores, pipes, and other metal-containing surfaces from corrosion damage caused by a scale removal solution or method. Examples of corrosion inhibitors include benzoin, benzoin-(4-phenylthiosemicarbazone), benzyl-(4-phenylthiosemicarbazone), α-pyridoin, 2,2'-pyridil, salts of N-1-n-hexyl-phthalamate, salts of N-1-n-decyl-phthalamate, salts of N-1-n-tetradecyl-phthalamate, benzimidazole, 2-methylbenzimidazole, 2-aminobenzimidazole, 2-aminoethylbenzimidazole, 2-(2-pyridyl)benzimidazole, 2-hydroxybenzimidazole, 2-mercaptobenzimidazole, 1-benzylbenzimidazole, 1,2-dibenzylbenzimidazole, indole, 1H-benzotriazole, 1,2-benzothiazole, benzaldehyde, 4-amino-5-mercapto-1,2,4-triazole, 3-phenyl-4-amino-5-mercapto-1,2,4-triazole, 1,12-bis(1,2,4-triazolyl)dodecane, octyl alcohol, propargyl alcohol, piperidine, 2-methylpiperidine, 3-methylpiperidine, 4-methylpiperidine, 4-benzylpiperidine, 3,5-dimethylpiperidine, 2,6-dimethylpiperidine, 2-chloroaniline, 2-fluoroaniline, 2-methoxyaniline, 2-ethoxyaniline, 2-methylanniline, glycine, 2-(bis(2-aminoethyl)amino) acetic acid, cinnamaldehyde, benzalacetone, chalcone, 1,4-bis(2-pyridyl)-5H-pyridazino[4,5-b]indole, 3,5-bis(2-thienyl)-1,3,4-thiadiazole, 2-(undecyldimethylammonio)butanol bromide, 2-(dodecyldimethyl-ammonio) butanol bromide, 2-(tridecyldimethyl-ammonio)butanol bromide, 2-(tetradecyldimethyl-ammonio)butanol bromide, 2-(pentadecyldimethyl-ammonio)butanol bromide, 2-hydroxy-1,4-naphthoquinone, gallic acid, α-D-glucose, tannic acid, 1-(2-pyridylazo)-2-naphthol, leucine, salts of N,N-diallyl-N-benzyl dodecyl ammonium cation, salts of N,N-diallyl-N'-formyl 1,6-hexanediammonium cation, N,N-dimethyl-N-benzyl dodecyl ammonium cation, salts of N,N-diallyl-N-propargyl-(12-N'-formylamino)-1-dodecyl ammonium cation, glutamic acid, methionine sulfoxide, methionine sulfone, creatine, N-phosphonomethylglycine, acetylcysteine, S-benzylcysteine, 2-(4(dimethylamino)benzylamino acetic acid, chlorotyrosine, bromotyrosine, iodotyrosine, dichlorotyrosine, dibromotyrosine, diiodotyrosine, chlorobromotyrosine, chlroroiodotyrosine, and bromoiodotyrosine.

In some embodiments, the corrosion inhibitor is present in an amount of 1 to 3 wt %, preferably 1.25 to 2.75 wt %, preferably 1.5 to 2.5 wt %, preferably 1.25 to 2.25 wt %, preferably 2 wt % based on a total weight of the conversion solution or the acid solution.

In some embodiments, the conversion solution and/or the acid solution further comprises a surfactant. As used herein, the term "surfactant" refers to a compound that lowers the surface tension (or interfacial tension) between two liquids, between a liquid and a gas, or between a liquid and a solid. The surfactant may be a nonionic surfactant, an anionic surfactant, a cationic surfactant, a viscoelastic surfactant, or a zwitterionic surfactant. The surfactant may also be a gemini surfactant of any of the types listed previously. The surfactant may serve a role as a water-wetting agent, a defoamer, a foamer, a detergent, a dispersant, or an emulsifier. A surfactant molecule comprises one or more hydrophilic head units attached to one or more hydrophobic tails. The tail of most surfactants comprises a hydrocarbon chain, which can be branched, linear, or aromatic. Fluorosurfactants have fluorocarbon chains. Siloxane surfactants have siloxane chains. Gemini surfactant molecules comprise two or more hydrophilic heads and two or more hydrophobic tails.

Many surfactants include a polyether chain terminating in a highly polar anionic group. The polyether groups often comprise ethoxylated (polyethylene oxide-like) sequences inserted to increase the hydrophilic character of a surfactant. Alternatively, polypropylene oxides may be inserted to increase the lipophilic character of a surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl)dimethylammonio]-1-propanesulfonate), cocamidopropyl hydroxysultaine, ocamidopropyl betaine, phospholipids, sultaine and sultaine derivatives, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3$—$(CH_2)_{10\text{-}16}$—$(O$—$C_2H_4)_{1\text{-}25}$—$OH$, such as octaethylene glycol monododecyl ether and pentaethylene glycol monododecyl ether; polypropylene glycol alkyl ethers having the formula: $CH_3$—$(CH_2)_{10\text{-}16}$—$(O$—$C_3H_6)_{1\text{-}25}$—$OH$; glucoside alkyl ethers having the formula $CH_3$—$(CH_2)_{10\text{-}16}$—$(O$-glucoside$)1\text{-}3$-$OH$, such as decyl glucoside, lauryl glucoside, octyl glucoside; polyethylene glycol octylphenyl ethers having the formula $C_8H_{17}$—$(C_6H_4)$—$(O$—$C_2H_4)_{1\text{-}25}$—$OH$, such as Triton X-100; polyethylene glycol alkylphenyl ethers having the formula $C_9H_{19}$—$(C_6H_4)$—$(O$—$C_2H_4)_{1\text{-}25}$—$OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group for example. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like. For example, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a poly-propylene oxide chain.

Another type of surfactant is a viscoelastic surfactant (VES). Conventional surfactant molecules are characterized by having one long hydrocarbon chain per surfactant headgroup. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

In some embodiments, the surfactant is present in an amount of 0.0075 to 0.75 wt %, preferably 0.01 wt % to 0.7 wt %, preferably 0.05 to 0.65 wt %, preferably 0.075 to 0.50 wt %, preferably 0.1 to 0.4 wt %, preferably 0.15 to 0.35 wt %, preferably 0.175 to 0.325 wt %, preferably 0.2 to 0.3 wt %, preferably 0.225 to 0.275 wt %, preferably 0.25 wt % based on a total weight of the conversion solution or the acid solution.

In practice, the method of removing a sulfate-comprising scale from the surface of a suitable component of an oil or gas well can be applied in various ways. For example, the solutions can be injected into a wellbore to remove scale within. Alternatively, the solutions can be injected directly at the site of a sulfate-comprising scale. Alternatively, the solutions can be allowed to circulate in a wellbore for a certain period of time. Alternatively, the solutions may be left in the wellbore to soak the sulfate-comprising scale. Alternatively, a wellbore containing the sulfate-comprising scale may be pre-washed by water and/or mutual solvent and/or pretreated with a surfactant before being treated with the solutions of the method. Alternatively, the solutions may be flowed through a tube or pipe to dissolve the sulfate-comprising scale within. In some embodiments, the solutions may be flowed through a tube or pipe at a flow rate of 0.00001 to 1000 L/min, preferably 0.0001 to 100 L/min, preferably 0.001 to 10 L/min. Alternatively, the solutions may be left in the tube or pipe to soak the sulfate-comprising scale. Alternatively, the solutions may be circulated through a portion of a tube or pipe in which liquid is able to flow to remove a blockage comprising the sulfate-comprising scale from a portion of the tube or pipe in which liquid is not able to flow.

Obviously, numerous modifications and variations of the present disclosure are possible in light of the above teachings. It is therefore to be understood that within the scope of the appended claims, the invention may be practiced otherwise than as specifically described herein.

The following examples describe and demonstrate exemplary embodiments of the method 100 described herein. The examples are provided solely for the purpose of illustration and are not to be construed as limitations of the present disclosure, as many variations thereof are possible without departing from the spirit and scope of the present disclosure.

EXAMPLES

Materials

Calcium sulfate ($CaSO_4$) was obtained from Hammond drierite company, USA. Calcium carbonate ($CaCO_3$) and potassium carbonate ($K_2CO_3$) was purchased from Sigma Aldrich. Sodium tetraborate ($Na_2[B_4O_5(OH)_4] \cdot 8H_2O$), hydrochloric acid (HCl), acetic acid ($CH_3COOH$), hydroxide base and water ($H_2O$) were also used.

Method of Preparation

Calcium sulfate (5 wt. %) and potassium carbonate (8 wt. %) was allowed to react using water as a solvent at ambient condition for at least two hours. The reaction took place in a round bottom flask where a continuous stirring was applied using a magnetic stirrer. Calcium carbonate, product of the reaction was filtered and dried overnight to remove all the solvent. The pH of the reaction was maintained to at least 11, throughout the course of contact between the conversion solution and the calcium sulfate.

The solubility tests were performed using acids such as HCl and acetic acid. The solubility of a reactant, calcium sulfate, and the converted product, calcium carbonate, was evaluated by dissolving a fixed amount of the converted product in 10 ml of an acid. A scale removal efficiency was calculated by a ratio of the dissolved converted product in acid to original amount of the converted product added in the acid.

Results

Figure 2:
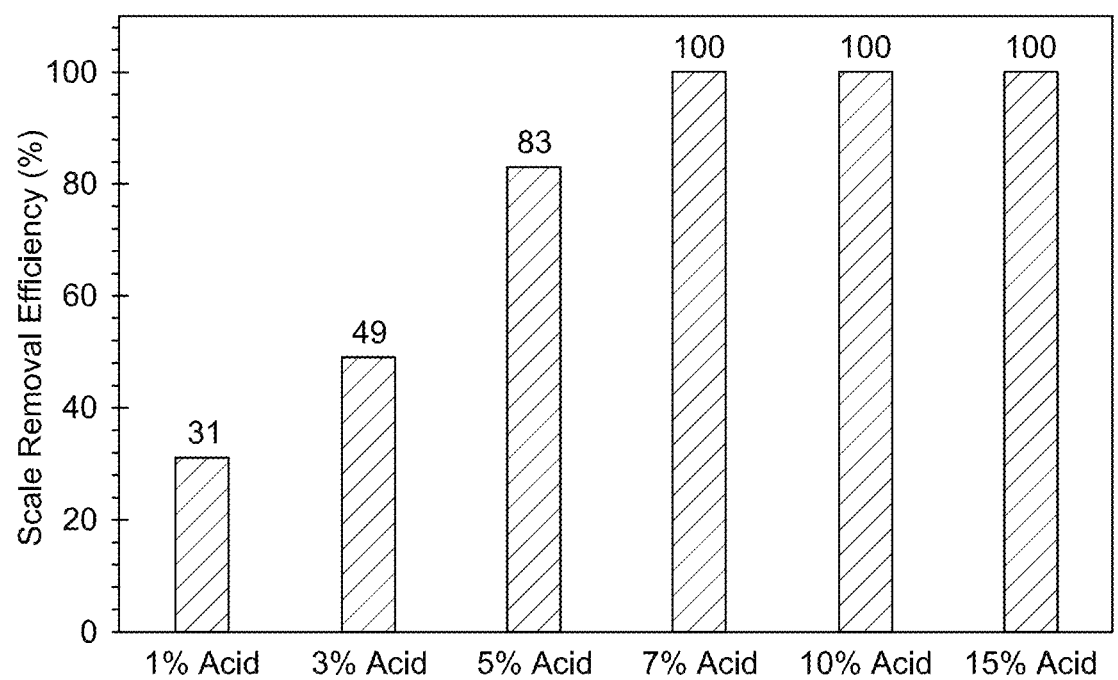
FIG. 2 is a graph depicting an effect of various concentrations of acetic acid on a calcium sulfate scale removal, according to certain embodiments.

FIG. 2 is a graph depicting an effect of various concentrations of acetic acid on a calcium sulfate scale removal. The calcium carbonate was dissolved in various concentrations of acetic acid to determine the effectiveness of acid concentration in scale removal. Six different concentrations of acetic acid, 1%, 3%, 5%, 7%, 10% and 15%, were prepared by dissolving 1 gram (g) of converted scale in acetic acid. From the FIG. 2, it can be observed that the concentration of the acid is proportional to the scale removal efficiency. At low concentrations of acetic acid, particularly at 1% and 3%, only a small percentage of scale was removed, about 31% and 49%, respectively. At such low concentrations, the concentration of the acetic acid was not sufficient to dissolve the converted product or the carbonate-comprising scale. However, increasing the concentration of the acetic acid resulted in increasing the scale removal efficiency. When the acetic acid concentration was 5%, a relative increase in the scale removal efficiency, of about 83%, was achieved. The descaling activity was found to be 100% with 7%, 10% and 15% of acetic acid.

Figure 3:
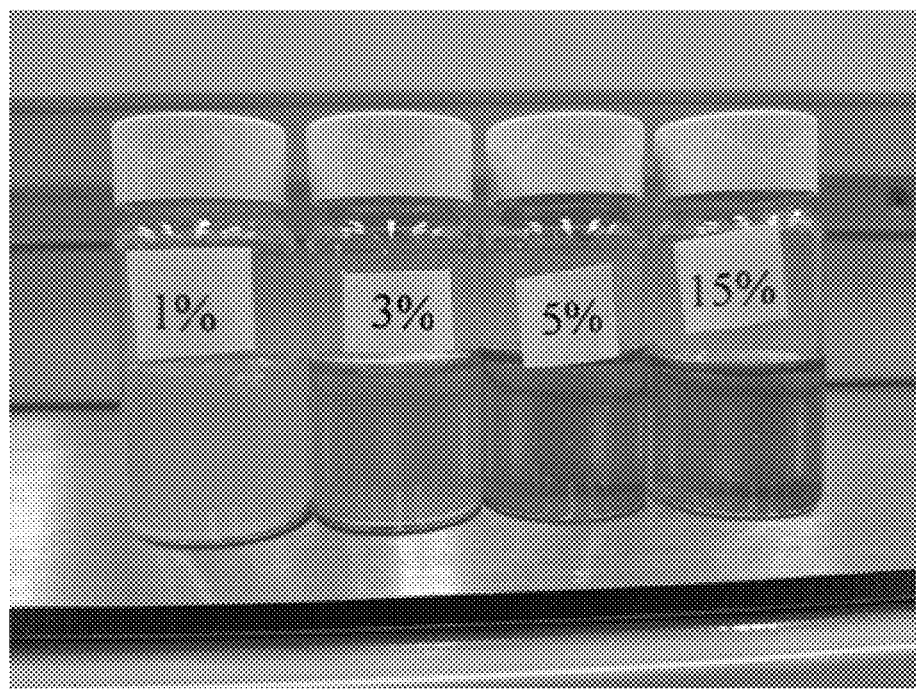
FIG. 3 shows solubility of a converted product in different concentrations of acetic acid; according to certain embodiments.

Referring to FIG. 3, an image of dissolved calcium carbonate or the converted product in different concentrations of acetic acid is illustrated. To determine the effect of the acetic acid concentrations, 4 different samples are shown. Sample 1 includes 1 g of calcium carbonate in 1% acetic acid; sample 2 includes 1 g of calcium carbonate in 3% acetic acid; sample 3 includes 1 g of calcium carbonate in 5% acetic acid; and sample 4 includes 1 g of calcium carbonate in 15% acetic acid. As can be observed in the FIG. 3, the solubility was found to be best with 15% acetic acid (sample 4). The degree of solubility for each of such samples is: sample 4>sample 3>sample 2>sample 1. A partial solubility is evident at a low concentration of acetic acid. Sample 4 has a clear solution because acetic acid has completely dissolved the carbonate in the carbonate-comprising scale, for descaling.

Figure 4:
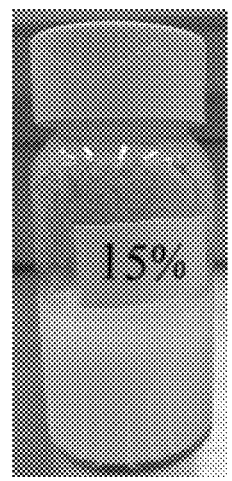
FIG. 4 shows solubility of calcium sulfate in acetic acid; according to certain embodiments.

Referring to FIG. 4, an image of undissolved calcium sulfate in acetic acid is illustrated. FIG. 4 shows a sample including 1 g of calcium sulfate in 15% acetic acid. A suspension of calcium sulfate in acetic acid is visible even at 15% acetic acid, indicating that calcium sulfate had almost zero solubility in the acetic acid. Comparative study of FIGS. 3 and 4 reveals that the conversion solution plays a critical role in converting the sulfate-comprising scale to its corresponding carbonates. The converted sulfate scale or the carbonate-comprising scale which is highly soluble is acids like acetic acid to remove the carbonate-comprising scale. The data suggests that the method of the present disclosure is highly efficient and effective in removing the calcium sulfate scale.

Figure 5:
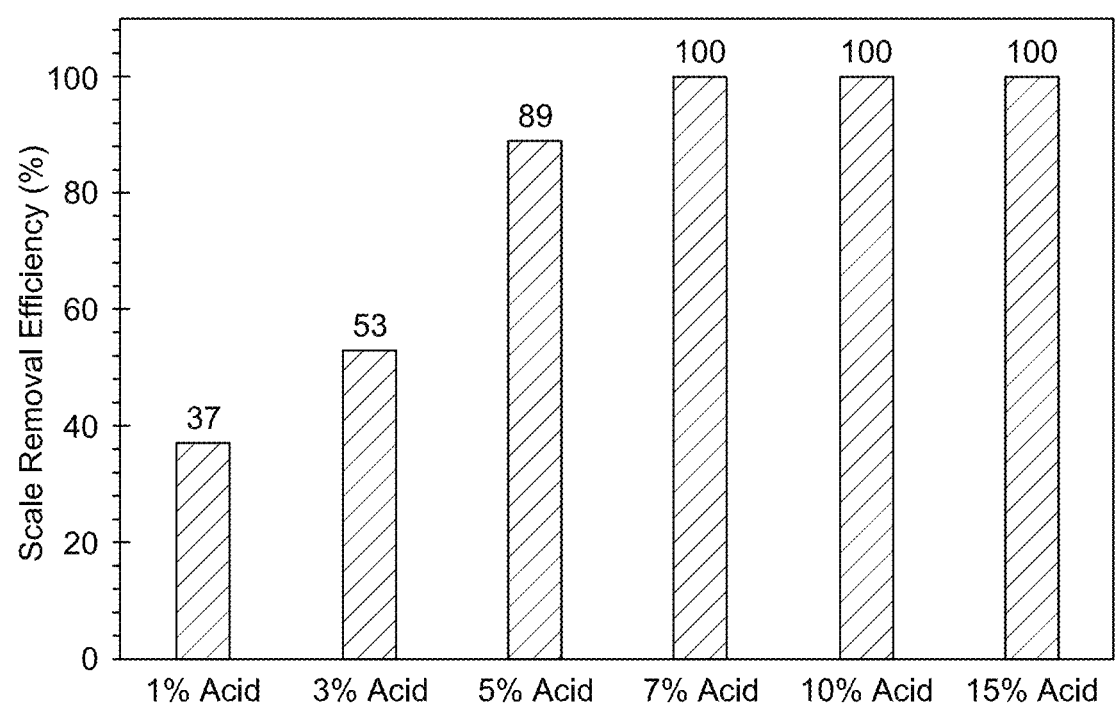
FIG. 5 is a graph depicting the effect of various concentrations of hydrochloric acid on a calcium sulfate scale removal, according to certain embodiments.

FIG. 5 is a graph depicting an effect of various concentrations of hydrochloric acid, on a calcium sulfate scale removal. For the present purpose, the converted product or the carbonate-comprising scale was dissolved in various concentrations of hydrochloric acid to determine the effectiveness of acid concentration in scale removal. Six different concentrations of hydrochloric acid, namely, 1%, 3%, 5%, 7%, 10% and 15%, were prepared by dissolving 1 gram (g) of converted calcium carbonate in hydrochloric acid. From the FIG. 5, it can be observed that the concentration of the hydrochloric acid is proportional to the scale removal efficiency. At low concentrations of hydrochloric acid, particularly at 1% and 3%, only a small percentage of scale was removed—about 37% and 53%, respectively. At such low concentrations, the concentration of the hydrochloric acid was not sufficient to dissolve the converted product or the carbonate-comprising scale. However, increasing the concentration of the hydrochloric acid resulted in increasing the scale removal efficiency. When the hydrochloric acid concentration was 5%, a relative increase in the scale removal efficiency, of about 89%, was achieved. The descaling activity continued to increase, unexpectedly and surprisingly, with 7%, 10% and 15% of hydrochloric acid. 100% descaling activity was observed at these concentrations.

The invention claimed is:

1. A method of removing a sulfate-comprising scale from a surface, the method comprising:
    contacting the sulfate-comprising scale with a conversion solution comprising 5 to 10 weight percent (wt. %) of an alkali metal carbonate, 0.5 to 10 wt. % of a borate salt or hydrate thereof, and 0.5 to 2.5 wt. % of a base to produce a carbonate-comprising scale, wherein wt. % is based on the total weight of the conversion solution; and
    exposing the carbonate-comprising scale with an acid solution comprising 7 wt. % of an acid,
    wherein the method removes 100% of an initial amount of the sulfate-comprising scale.

2. The method of claim 1, wherein the alkali metal carbonate is potassium carbonate.

3. The method of claim 1, wherein the borate salt is sodium tetraborate.

4. The method of claim 1, wherein the base is a hydroxide base.

5. The method of claim 1, wherein the conversion solution has a pH at an initiation of the contacting of at least 10 to 14.

6. The method of claim 5, wherein the conversion solution has a pH throughout a duration of the contacting of at least 10 to 14.

7. The method of claim 1, wherein the sulfate-comprising scale comprises at least one selected from the group consisting of barium sulfate, calcium sulfate, and strontium sulfate.

8. The method of claim 7, wherein the carbonate-comprising scale comprises at least one selected from the group consisting of barium carbonate, calcium carbonate, and strontium carbonate.

9. The method of claim 1, wherein the acid is at least one selected from the group consisting of hydrochloric acid, formic acid, acetic acid, citric acid, N,N-Dicarboxymethyl glutamic acid tetrasodium salt (GLDA), Ethylenediamine tetraacetic acid (EDTA), Hydroxyethyl Ethylenediamine Triacetic Acid (HEDTA), trisodium dicarboxymethyl alaninate (MGDA), Nitrilotriacetic acid (NTA), Diethylenetriamine pentaacetate (DTPA), penta(methylene phosphonic acid) (DTPMP), Hydroxyethylidene Diphosphonic Acid (HEDP), and MACROPA.

10. The method of claim 1, wherein the sulfate-comprising scale is removed from at least one selected from the group consisting of a surface facility, a surface pipeline, a well tubular, a downhole pump, a downhole tool, and a geological formation, of an oil or gas well.

11. The method of claim 10, wherein the oil or gas well is a sour gas well comprising a sour natural gas comprising 4 to 4000 parts per million (ppm) hydrogen sulfide.

12. The method of claim 10, wherein the oil or gas well is a sour crude oil well comprising a sour crude oil comprising 0.5 to 10 wt. % sulfur.

13. The method of claim 1, wherein the sulfate-comprising scale is removed from at least one selected from the group consisting of a surface facility, a surface pipeline, a well tubular, a downhole pump, a downhole tool, and a geological formation, of a carbon dioxide sequestration well.

14. The method of claim 1, wherein the contacting is performed for 1 to 12 hours.

15. The method of claim 1, wherein the conversion solution consists of 5 to 10 wt. % of the alkali metal carbonate, 0.5 to 10 wt. % of the borate salt or hydrate thereof, and 0.5 to 2.5 wt. % of the base to produce the carbonate-comprising scale.

16. The method of claim 1, further comprising:
    after the contacting and before the exposing, removing the conversion solution from the carbonate-comprising scale then drying the carbonate-comprising scale.

* * * * *